(12) United States Patent
Ozanne et al.

(10) Patent No.: US 8,739,686 B2
(45) Date of Patent: Jun. 3, 2014

(54) CAPSULE PIERCING MODULE

(71) Applicant: Nestec S.A., Vevey (CH)

(72) Inventors: Matthieu Ozanne, Champanges (FR); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/680,926

(22) Filed: Nov. 19, 2012

(65) Prior Publication Data
US 2013/0142929 A1 Jun. 6, 2013

Related U.S. Application Data

(62) Division of application No. 12/302,229, filed as application No. PCT/EP2007/054421 on May 8, 2007, now Pat. No. 8,316,759.

(30) Foreign Application Priority Data

May 24, 2006 (EP) .................................... 06010718

(51) Int. Cl.
- *B67D 1/00* (2006.01)
- *A47J 31/00* (2006.01)
- *A47J 31/06* (2006.01)

(52) U.S. Cl.
USPC ............................ 99/275; 99/289 R; 426/590

(58) Field of Classification Search
None
See application file for complete search history.

(56) References Cited

U.S. PATENT DOCUMENTS

| 6,182,554 B1 | 2/2001 | Beaulieu et al. |
| 2002/0023543 A1 | 2/2002 | Schmed |
| 2003/0066431 A1 | 4/2003 | Fanzutti et al. |

FOREIGN PATENT DOCUMENTS

| EP | 1495702 | 1/2005 |
| EP | 1510160 | 3/2005 |
| EP | 1529469 | 5/2005 |
| EP | 1529469 A1 * | 5/2005 |
| WO | 2004049878 | 6/2004 |

OTHER PUBLICATIONS

International Search Report for International Application No. PCT/EP2007/054421 mailed Jul. 17, 2007.
Written Opinion for International Application No. PCT/EP2007/054421 mailed Jul. 17, 2007.

\* cited by examiner

*Primary Examiner* — Humera Sheikh
*Assistant Examiner* — Subbalakshmi Prakash
(74) *Attorney, Agent, or Firm* — K&L Gates LLP

(57) ABSTRACT

A capsule-based beverage production machine that comprises a module designed for producing a beverage on the basis of ingredients which are contained in a capsule. The module comprises: means for retaining the capsule in a fixed position, and means for perforation of the capsule, wherein the perforation means are controlled to perforate the capsule after the capsule is retained in the fixed position by the retaining means.

14 Claims, 10 Drawing Sheets

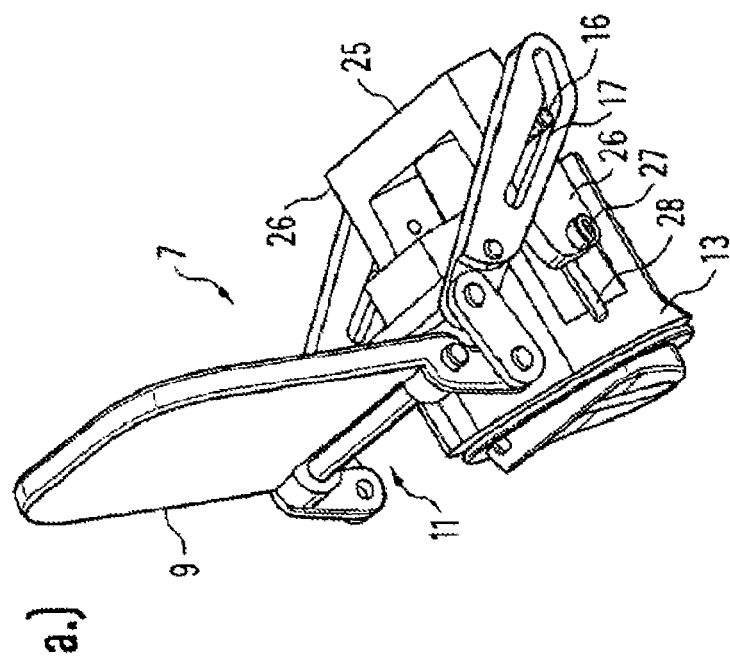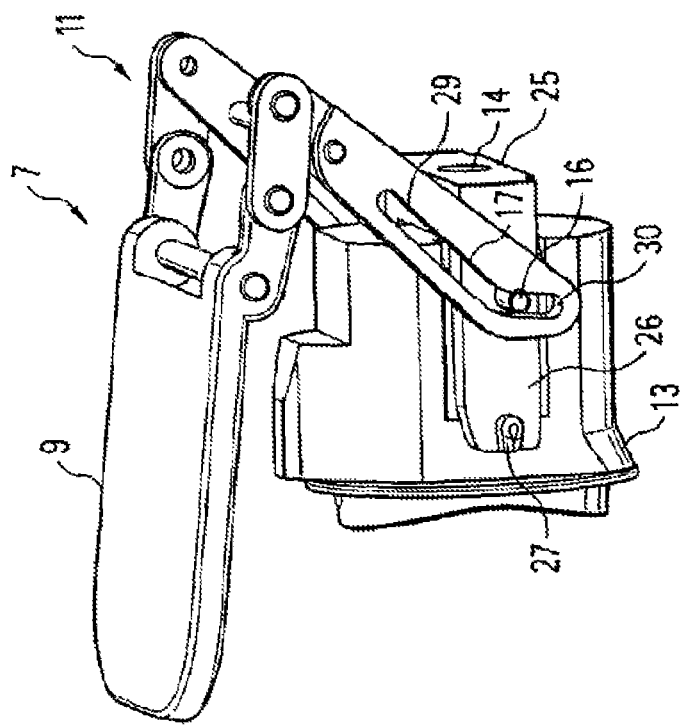
Fig. 5

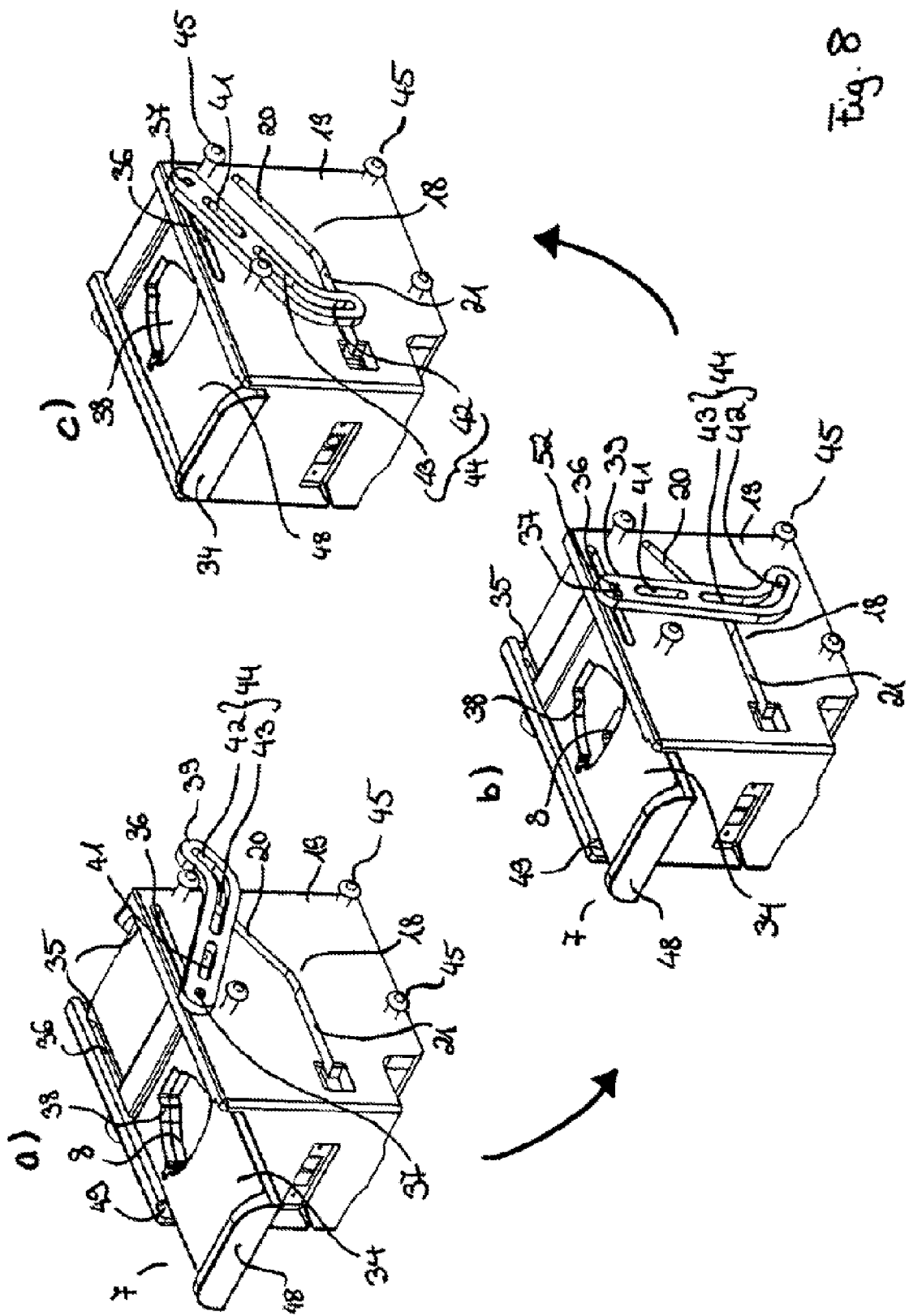

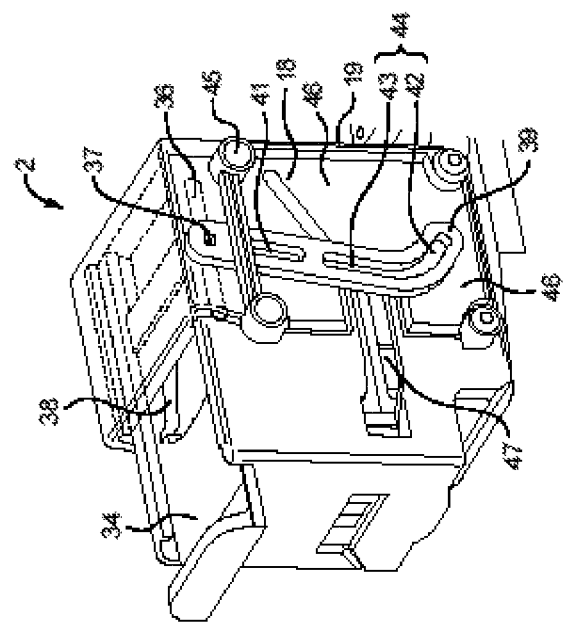
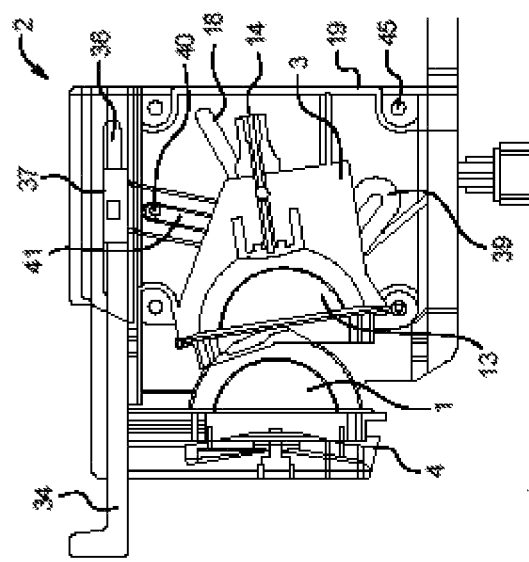
FIG. 10
FIG. 9

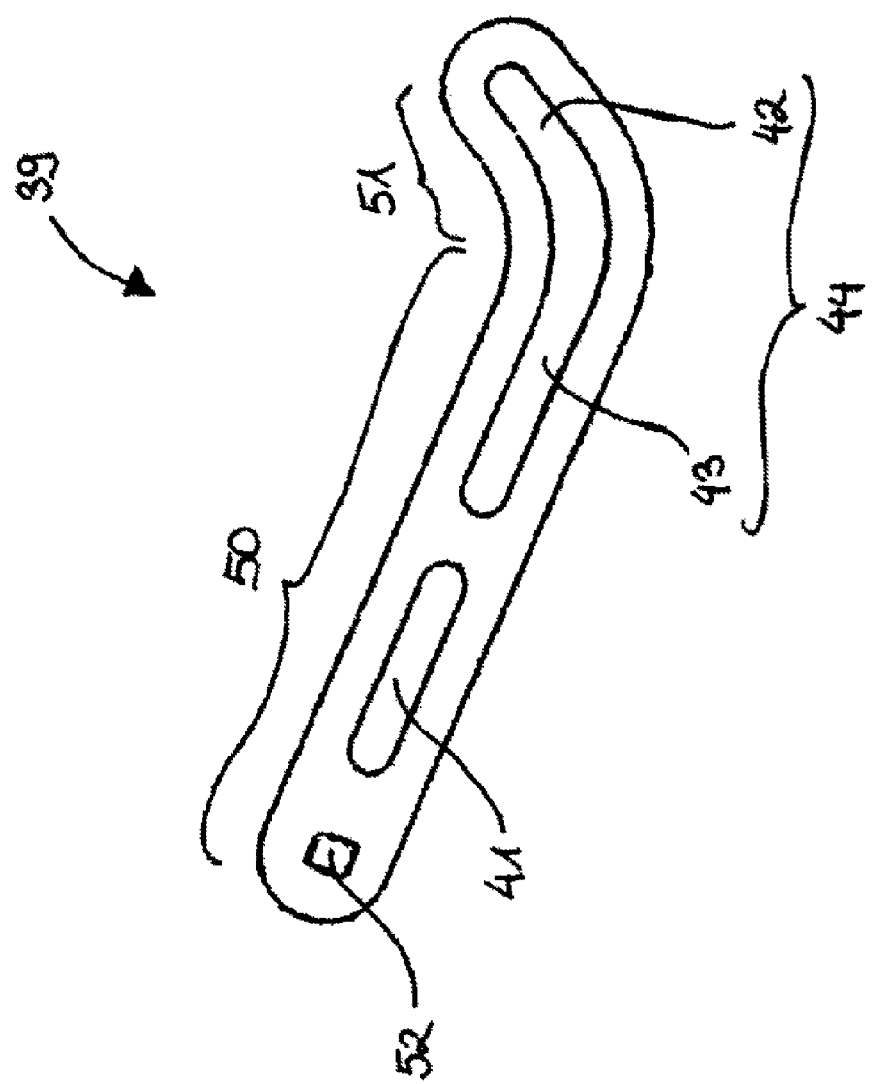

CAPSULE PIERCING MODULE

CROSS REFERENCE TO RELATED APPLICATIONS

The present application is divisional application of U.S. Ser. No. 12/302,229, filed Jan. 21, 2009, which is a National Stage of International Application No. PCT/EP2007/054421, filed on May 8, 2007, which claims priority to European Patent Application No. 06010718.2, filed on May 24, 2006, the entire contents of which are being incorporated herein by reference.

BACKGROUND

The present invention relates to the field beverages or other liquid comestibles (soups, of producing etc.) on the basis of ingredients which are contained in a capsule.

The capsule is inserted into the beverage production module of a beverage production machine (coffee machine, etc.). The module is designed to inject a liquid such as for example hot water under pressure into the capsule in order to have the liquid interact with the ingredients contained in the capsule.

Note that some beverage production techniques ask for a pressurized injection, others such as e.g. brewing tea can be made at ambient pressure. The invention can find application in both scenarios.

The result of the interaction, i.e. the produced beverage or liquid comestible is then drained from the capsule and fed to a receptacle such as e.g. a coffee cup placed below an outlet for the beverage.

SUMMARY

The invention preferably deals with capsules which are inserted into the beverage production module while being sealed. Therefore, the capsules have to be opened both at a fluid inlet side as well as at an outlet side after being inserted into the beverage production module.

The invention now targets at a reliable perforation of the capsule inside the beverage production machine.

This object is achieved by means of the features of the independent claims. The dependent claims develop further the central idea of the present invention.

According to a first aspect of the present invention a method for operating a beverage production system comprising a beverage production module and a capsule containing ingredients is proposed. The module injects a liquid into the capsule in order to produce a beverage. The module comprises at least a first and a cooperating second capsule engagement member, which first and second operating capsule engagement member are moved relative to each other.

The method comprises the step of inserting the capsule in the beverage production module. Then the first capsule engagement member is moved relative to the second capsule engagement member position in which position by in order to arrive at a relative closing the capsule is retained in a defined being engaged by the first and second engagement member.

After the capsule is safely retained in the defined position, the capsule is opened.

The capsule can be retained in the defined position by a clamping engagement of the first and second engagement member.

At least one of the first and second engagement members and perforation means are mechanically coupled such that the perforation means open the capsule after the capsule is retained in the defined position.

At least one of the first and second engagement members and the perforation means actuator can be controlled by a common actuator.

A further aspect of the present invention relates to a beverage production machine comprising a beverage production module designed for producing a beverage on the basis of ingredients contained in a capsule. The beverage production module comprises means for retaining the capsule in a defined position.

Opening means are designed to open the capsule while the capsule is retained in the defined position by the retaining means.

The retaining means and the opening means can be mechanically coupled such that the opening means open the capsule after the capsule is safely retained in the fixed position by the retaining means.

The retaining means can comprise a first and a second capsule engagement member which are supported relatively displaceable to each other such that they can immobilize the inserted capsule in the defined position.

The opening means can be perforation means which are functionally associated with one of the first and second engagement members and designed to be displaced at least partially together with the associated engagement member.

The retaining means and the opening means (perforation means) can be controlled by a common manual or electric actuator.

A further aspect of the present invention relates to a beverage production machine designed for producing a beverage from a capsule. The beverage production machine comprises a module with a first capsule member, which can be displaced relative to a second, cooperating capsule engagement member between an opened capsule in searching position and a closed capsule-enclosure position.

The relative displacement is a combined displacement comprising a linear displacement when the first and second capsule engagement members are close together and a swivelling or rotating movement when they are distanced from each other.

Capsule perforation means can be functionally associated with one of the first and the second engagement members such that the perforation means protrude into the capsule-enclosure space after the first and second engagement members have reached the capsule engagement position, and the perforation means are transferred into a retracted position relative to the associated engagement member during or after the swivelling movement.

Additional features and advantages are described herein, and will be apparent from the following Detailed Description and the figures.

BRIEF DESCRIPTION OF THE FIGURES

FIG. 5a, 5b shows an isolated view of the first engagement member and the control means in the capsule insertion state (FIG. 5a) and the capsule engagement state (FIG. 5b), respectively, according to a first embodiment of the present invention, FIGS. 8a to 8c show a perspective view of a beverage production module illustrating the sequence of FIGS. 7a to 7c, FIG. 9 shows a beverage production module with an actuator mechanism according to the second embodiment of the present invention in the intermediate position, FIG. 10 shows the casing of a beverage production module having an actuator mechanism according to the second embodiment of the present invention and FIG. 11 shows a detailed view of the coupling element according to the second embodiment of the present invention.

DETAILED DESCRIPTION

Figure 1:
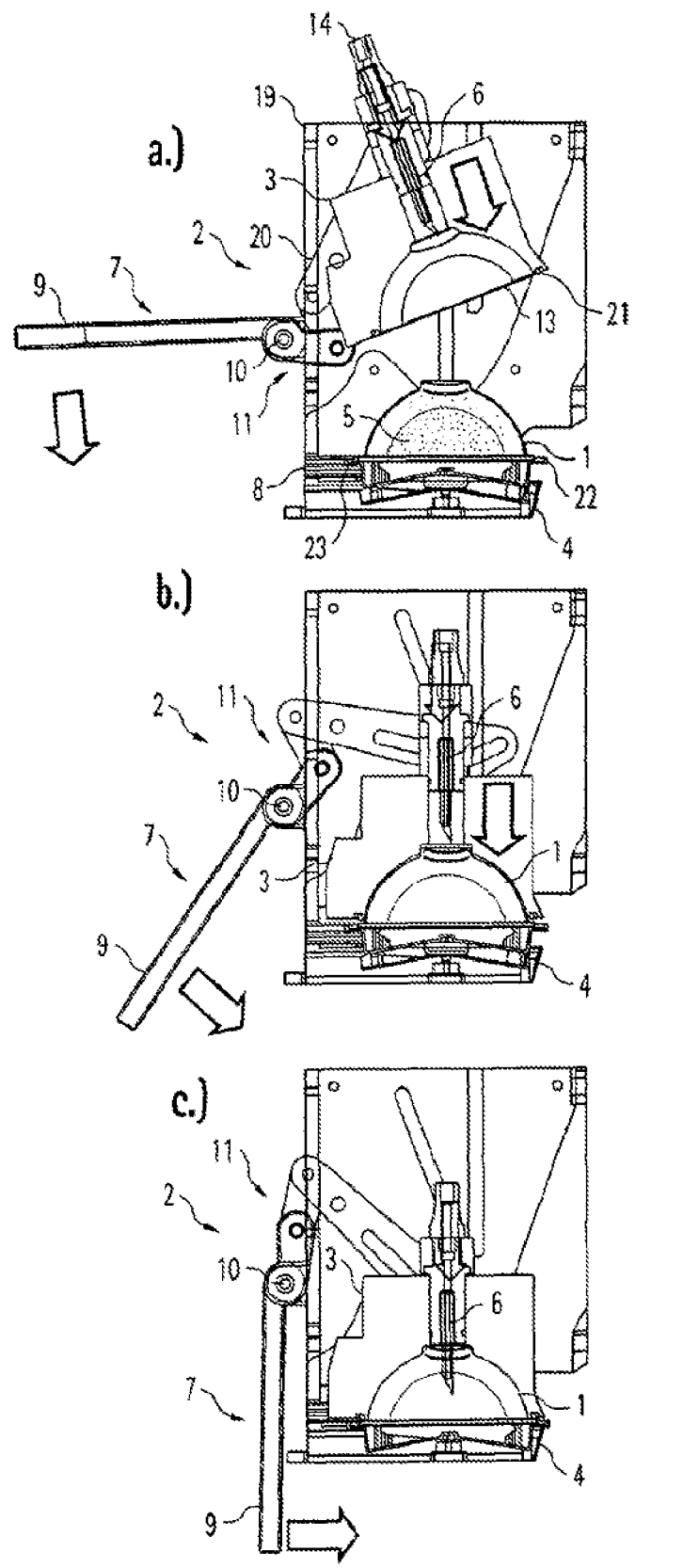
FIG. 1a-1c show a sequence for illustrating the transfer from a capsule insertion state, (FIG. 1a) to a capsule enclosure state (FIG. 1c) and show an actuator mechanism according to a first embodiment of the present invention.

Throughout the figures only the beverage production module 2 of a beverage production machine is shown.

Usually the beverage production module 2 is supplied with a liquid at a liquid inlet 14 which can be in fluid connection with means for heating and/or pressurizing the supplied liquid.

At the outlet side, means for guiding a produced beverage or liquid comestible to a designated outlet of the beverage production machine is provided.

The beverage production module 2 as shown in the figures is preferably housed in a casing of the beverage production machine such that it assumes an essentially horizontal position as shown in FIGS. 1-4 and FIGS. 7-10, respectively.

Note that other arrangements of the beverage production module 2 are equally possible, although the horizontal arrangement has the advantage that the insertion of the capsule and the subsequent pre-positioning are assisted by gravity.

FIG. 1a shows a state of the beverage production module 2 in which a capsule 1 being at least partially filled with ingredients 5 can be inserted from the top through an opening (slot) 8 of a casing 19 of the beverage production module 2.

FIG. 1a shows the state in which the capsule 1 has been already manually inserted by a user from the top through the opening 8 into the interior of the casing 19 of the beverage module 2.

Preferably in the state as shown in FIG. 1a the capsule 1 is held by pre-fixation means 12 which will be explained later on in detail referring to FIG. 6.

As can be seen in FIG. 1a, in this pre-fixation position the capsule 1 is preferably held in an essentially vertical orientation, i.e. the symmetrical axis of the capsule is essentially horizontal.

Other pre-positioning arrangements of the capsule 1 can be thought of in which the capsule 1 is held in an orientation which forms a small (acute) angle vis-à-vis the vertical axis.

In the state as shown in FIG. 1a the capsule is pre-fixed close to a second engagement member 4 which can comprise means for opening (perforating, etc.) the face of the capsule adjacent to the second engagement member 4.

The first engagement member 3 is in an opened state, i.e. as controlled by a manual actuator mechanism in the capsule insertion state as shown in FIG. 1a, the first capsule engaging member 3 is distanced from the second engagement member 4, wherein this distance is substantially larger than the corresponding dimensions of the capsule 1.

According to a further aspect which will be explained in detail later on, optionally the first engagement member 3 is not only distanced from, but also slightly rotated vis-à-vis the main plane formed by the second engagement member 4.

In the embodiment of FIG. 1 the first engagement member 3 is provided with capsule opening means, which can be perforation means such as a hollow needle 6. In FIG. 1a the perforation means 6 are in a position in which they are retracted such that they do not protrude into a half dome formed by a hollow bell member 13 of the first engagement member 3. The hollow bell member 13 has an essentially matching shape to the contour of the capsule 1.

The rear end of the first engagement member 3 is provided with a liquid supply 14 which is in fluid connection with the hollow needle (perforation member) 6.

The first engagement member 3 is connected to an actuator mechanism 7. According to a first embodiment the actuator mechanism 7 comprises a manually operable lever handle 9 and the first engagement member 3 is connected to the lever handle 9 by means of a knee-joint mechanism 11 which can preferably comprise several axis 10 and intermediate levers 20.

In a second embodiment the first engagement member 3 is connected to a manually operable drawer 34 by means of a coupling element 39 which can preferably comprise several openings and clearance areas adapted to cooperate with several pins.

The actuator mechanism 7 is designed to control both the displacements of the first engagement member 3 and the displacements of the perforation member 6. Note that alternatively or additionally an electric actuator can be used.

By operating the lever handle 9 or the drawer 34 of the actuator mechanism 7, the first engagement member 3 can be transferred into an intermediate stage as shown in FIG. 1b. The intermediate stage as shown in FIG. 1b is characterized in that the hollow bell member 13 has essentially fully engaged the outer contour of the capsule 1, while the hollow needle (perforation member) 6 is still in its retracted position vis-à-vis the bell member 13 and correspondingly the perforation member 6 is not yet interfering with the capsule 1.

Now, when turning the lever handle 9 further in the anti-clockwise direction, the beverage production module 2 can be transferred from the intermediate stage as shown in FIG. 1b to a final closure state as shown in FIG. 1c. The final closure state as shown in FIG. 1c is characterized in that the hollow bell member 13 still fully engages the capsule 1, however, also mechanically controlled by manipulating the actuator mechanism 7, the perforation member 6 has been actively pushed from its retracted position (FIG. 1a, 1b) to a protruding position as shown in FIG. 1c.

By being actively moved from the retracted position to the protruding position as shown in FIG. 1c, the perforation member 6 will perforate the associated face of the capsule 1 and will at least partially protrude into the interior of the capsule 1.

In this state the liquid supplied to the liquid supply 14 of the first engagement member 3 can be injected into the interior of capsule 1 through the perforation member 6. Thus, in the state as shown in FIG. 1*c* the injected liquid can be made to interact with the ingredients of the capsule 1 in order to produce a beverage or another liquid comestible.

During the transition from the capsule insertion state of FIG. 1*a* to the final closure state as shown in FIG. 1*c*, the first capsule engagement member 3 has been moved along a composite trajectory vis-à-vis the second engagement member 4. The composite trajectory preferably comprises a rotational movement at the beginning in order to align the front contour 21 of the first engagement member 3 with the vertical plane of the second engagement member 4.

Both in the intermediate stages shown in FIG. 1*b* and the final closure state as shown in FIG. 1*c* the capsule 1 is held safely in a defined position by having a flange-like rim portion of the capsule 1 being clamped between the rim of the front contour 21 of the first engagement member 3 and in associated clamping surface 23 of the second engagement member 4.

In other words, according to one aspect of invention, the capsule 1 finds itself already the present in a defined perforation position before the perforation member 16 will start its opening or peroration action on the associated wall of the capsule 1. Therefore, when the perforation member 6 will perforate the associated wall of the capsule 1 this can be done with a high precision as the capsule 1 is not moving relative to the main elements of the beverage production module 2 when it encounters the opening action of the perforation member 6. This leads to a higher position of the opening action and preferably both the location and the timing of the opening can be finely adjusted.

Preferably the perforation position of the capsule 1 also corresponds to the beverage production position in which the liquid is injected into the capsule 1.

The cooperation of the first and second engagement members 3, 4 in the perforation and beverage production position is such that the capsule 1 is contained in a pressure tight manner in a space defined by the hollow bell member 13 of the first engagement member 3 on the one hand and the second engagement member 4 on the other hand. Thus, liquid injected into the interior of the capsule 1 under pressure can only flow through the capsule 1, but can not leak outside the capsule walls. Preferably the sealing engagement occurs at the flange-like rim of the capsule pinched between the first and second engagement members 3, 4.

FIGS. 2*a* to 2*c* essentially show the same transition from the capsule insertion state of the beverage production module 2 to the final closure state of FIG. 2*c*, which is only also the beverage production state of the beverage production module 2.

After the end of the beverage production, the actuator means 7 can again be manually and/or electrically operated in order to transfer the beverage production module 2 back to the opened capsule insertion state (FIG. 2*e*).

However, according to the invention, the transition from the beverage production state (FIG. 2*c*) to the capsule insertion state according to FIG. 2*e* is not simply a reversal of the closing movement, i.e. the transfer of FIG. 2*a* to FIG. 2*c*.

Figure 2:
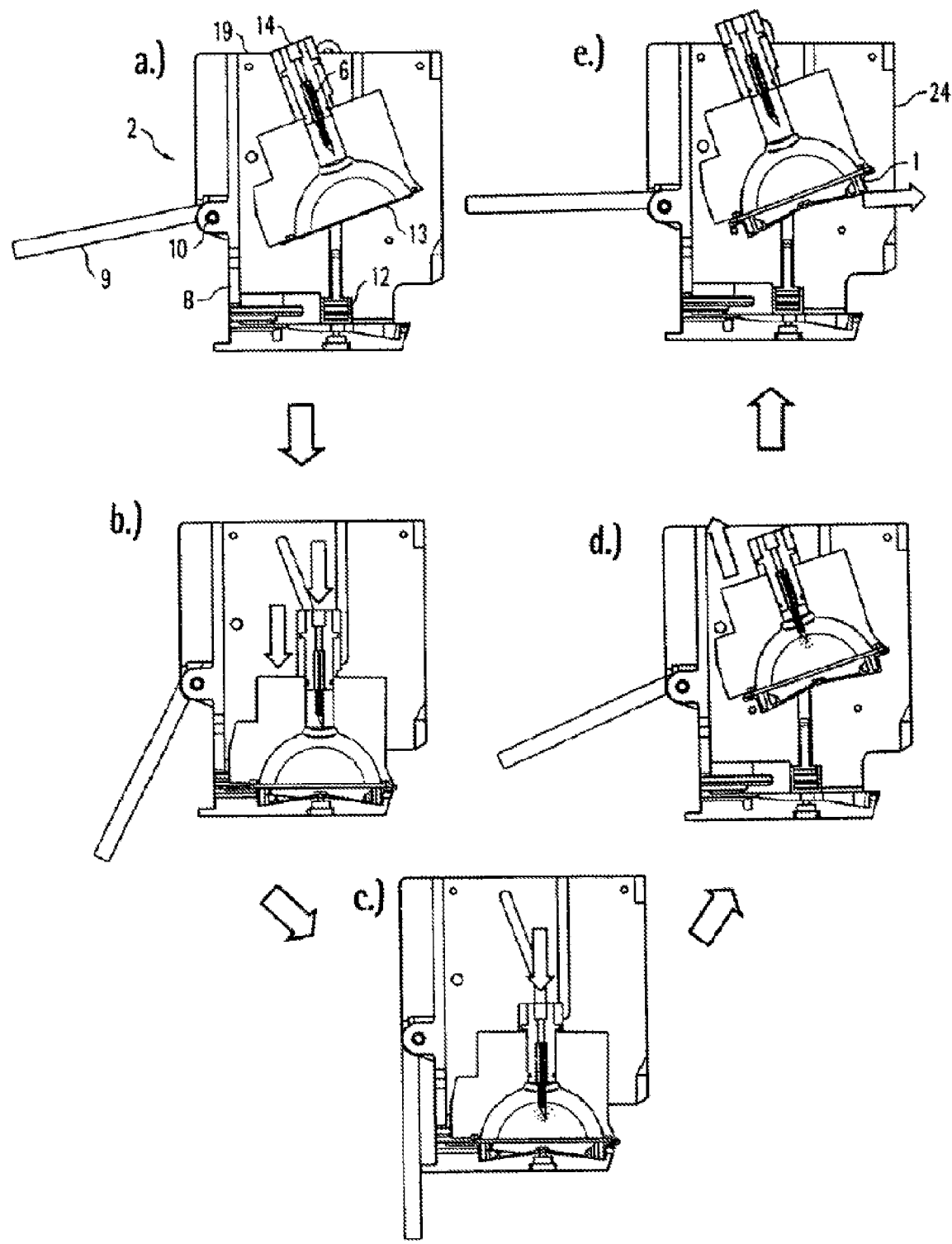
FIG. 2a-2e show the complete cycle of transferring a beverage production module according to the present invention from a capsule insertion state (FIG. 2a) to a capsule enclosure state (FIG. 2c) and back to the capsule insertion state (FIG. 2e) and show an actuator mechanism according to a first embodiment of the present invention.

As it is shown in FIG. 2*d* and FIG. 2*e*, when manually moving the lever handle 9 of the actuator mechanism 7 in the clockwise direction of the embodiment of FIG. 2, in a first step the first engagement member 3 is linearly retracted and distanced from the second engagement member 4•

Likewise, a movement of the drawer 34 in a direction away from the beverage production module 2 causes the first engagement member 3 to be linearly retracted and distanced from the second engagement member 4.

Essentially due to the friction between the perforation member 6 and the surrounding walls of the opening in the capsule 1 the perforation member 6 remains in the protruded state and thus holds the capsule 1 in the hollow bell member 13 of the first engagement member 3 when the first engagement member 3 is transferred to the intermediate state as shown in FIG. 2*d*.

This holding-back function of the perforation member 6 of the first engagement member 3 thus leads to a separation of the capsule 1 from the second capsule engagement member 4.

Starting from the intermediate state as shown in FIG. 2*d* the first engagement member 3 is controlled to carry out a swivelling movement. During the final transition to the capsule insertion state as shown in FIG. 2*e* the perforation member 6 is finally made to be retracted from the hollow bell member 13. The capsule 1 which has been hitherto retained by the frictional engagement with the perforation member 6, will drop from the first capsule engagement member 3 and will be discharged from the beverage module 2 through a opening 24 at the lower side of the beverage production module 2.

Thus, the swivelling movement at the end of the trajectory of the first capsule engagement member 3 facilitates the discharge of the capsule 1 in the retracted position e.g. towards a waste container placed inside the beverage production machine and below the beverage production module 2.

While FIG. 2 in the above explanation mainly serve to illustrate the functionality of the present invention, further implementation details according to a first embodiment of the present invention will now be explained with reference to FIGS. 3, 4 and 5.

As shown in FIGS. 5*a* and 5*b*, the actuator mechanism 7 comprises a lever handle 9 acting on a knee-joint mechanism 11, wherein the extremity of the actuator mechanism 7 being at the opposite end of the lever handle 9 comprises a first control curve 17.

This first control curve 17 cooperates with a guiding pin 16 which is fixed to a U-shaped support member 25 which in its centre portion supports the perforation member 6 and the fluid supply 14.

Each of the two outer legs 26 of the U-shaped support member 25 are respectively provided with a guiding pin 16.

The U-shaped support member 25 can be linearly displaced vis-à-vis the bell-shaped member 13 by having a further control pin 27 cooperate with an axial slot 28 respectively provided at each of the side surfaces of the hollow bell member 13.

Therefore, the cooperation of the first guiding curve 17 with the guiding pin 16 is designed to selectively displace the first engagement member 3, comprising essentially the U-shaped support member 25 and the attached perforation member 6 as well as the bell-shaped member 13. On the other hand, the guiding curve 17 is designed to selectively control a relative displacement of the U-shaped support member 25 vis-à-vis the dome member 13 and thus a displacement of the perforation member 6 attached to the U-shaped support member 25 vis-à-vis the dome-shaped member 13.

Figure 3:
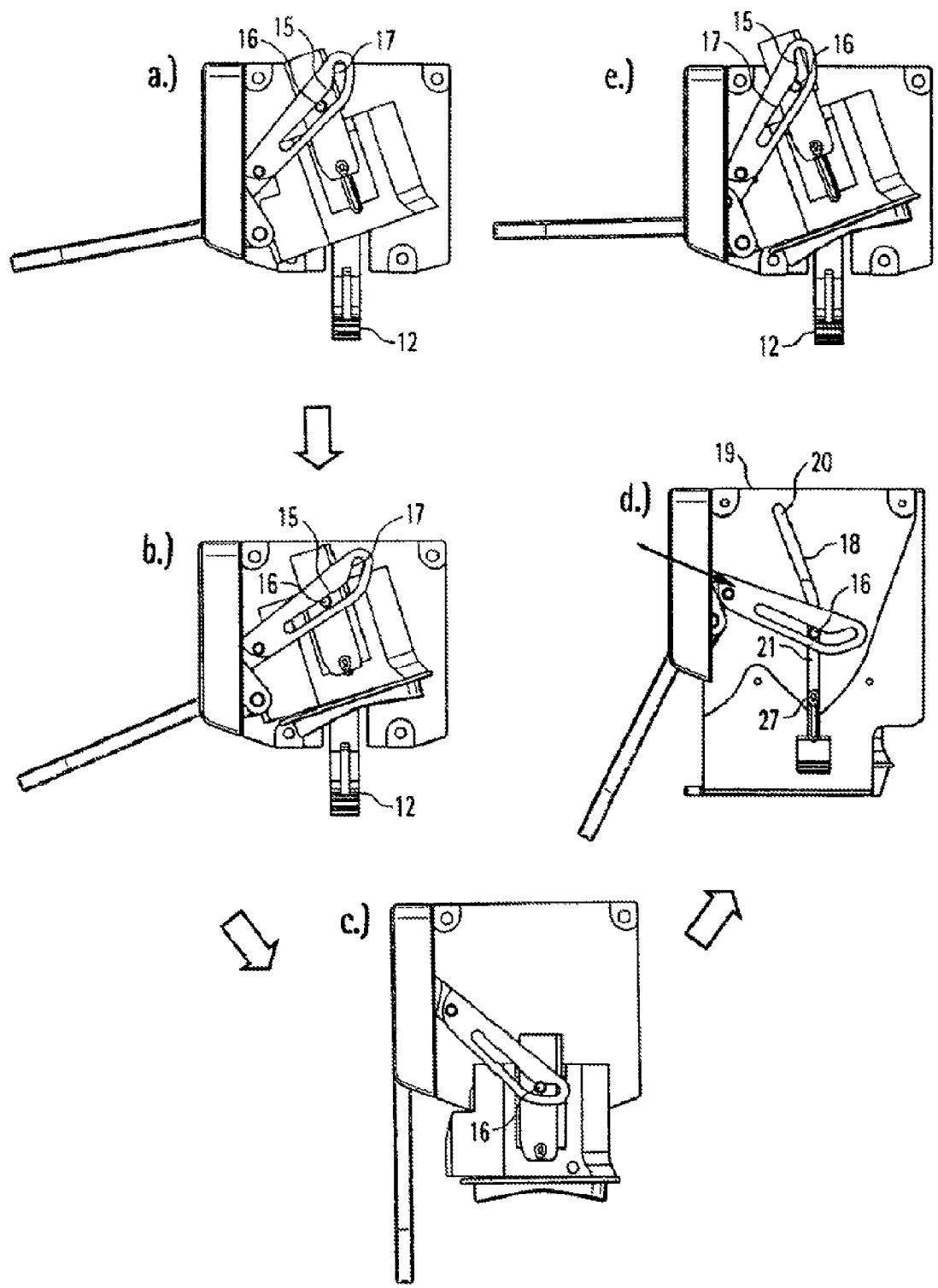
FIG. 3a-3e illustrates beverage production sequence steps for the beverage production module according to an embodiment of the invention.
Figure 4:
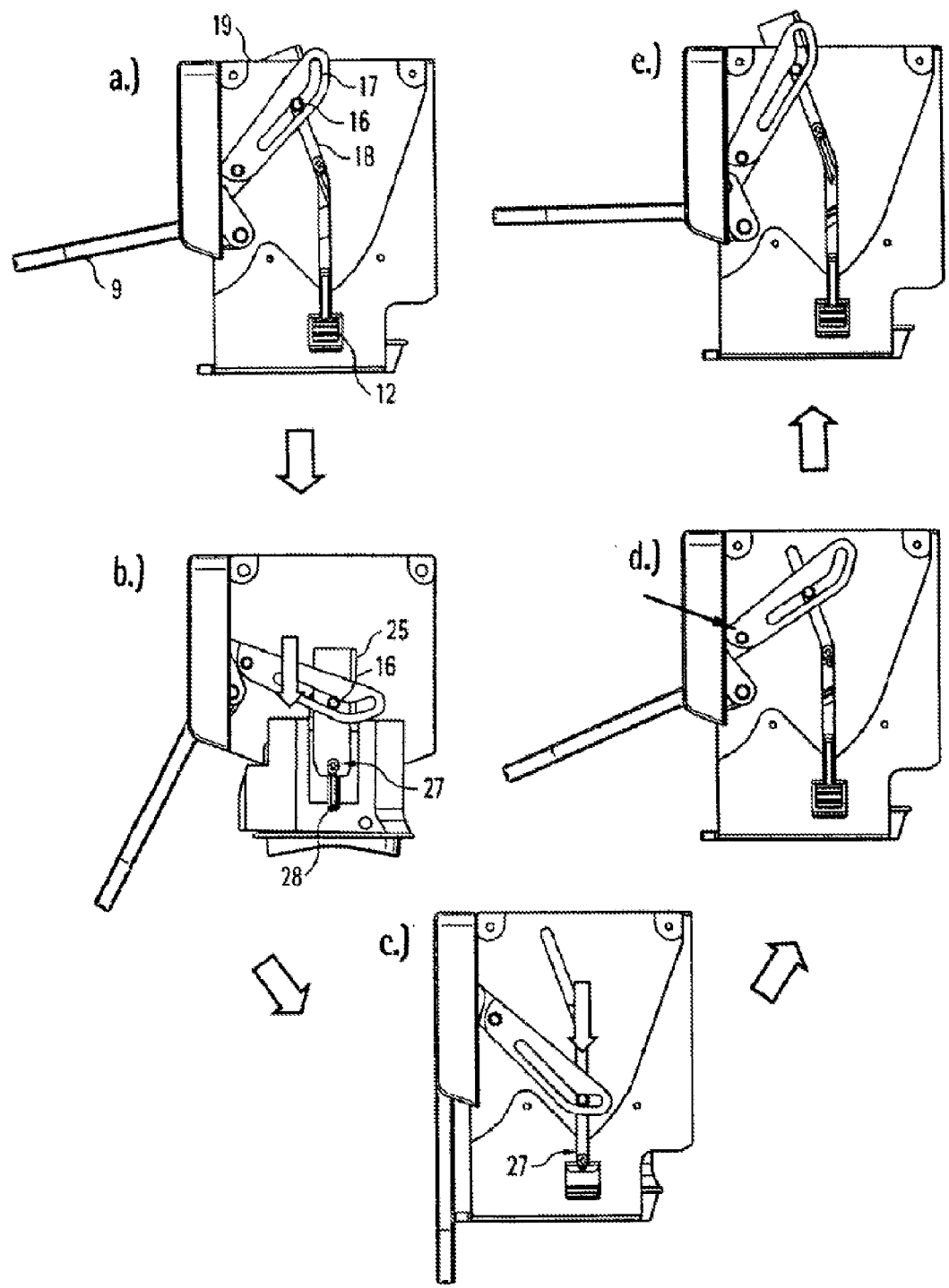
FIG. 4a-4e show the steps according to the sequence of FIG. 3, however, in a representation illustrating the control and guiding means for the relative movements of the first and second engagement member and the perforation means, respectively, according to a first embodiment of the present invention.

As can be seen in FIGS. 3 to 5, the first guiding curve 17 is essentially composed of a first linear section 29 and a second linear section 30, being shorter than the first linear section 29 and forming an obtuse angle vis-à-vis the first linear section 29.

When starting from the capsule insertion position (FIG. 3a, 4a), the guiding pin 16 is made to cooperate with the first linear section 29 which is designed to linearly and integrally displace the first engagement member 3.

On the other hand, in the final phase, i.e. when the first engagement member 3 approaches the beverage production state (transition from FIGS. 3b to 3c, 4b to 4c), the guiding pin 16 is made to cooperate with the second linear section 30 of the guiding curve 17. This second linear section 30 is designed to essentially control a relative displacement of the U-shaped support member 25 and the fixedly attached perforation member 6 vis-à-vis the dome ship member 13.

Therefore, it is due to this specific design of the guiding curve 17 (having at least two different sections) that (cooperation with the first linear segment 29) the capsule is held in a defined position before (cooperation with the second linear segment 30) the perforation member 6 is made to open the capsule.

Other functional couplings between the motion control of the perforating means and at least one of the engagement members can be thought of which also guarantee a immobilisation of the capsule in the perforation position before it is perforated at its liquid inlet face.

As can be seen particularly from FIGS. 3d, 4a, c, d and e, the guiding pin 16 is not only made to cooperate with the first guiding curve 17 (being part of the actuator mechanism 7), but also with a second guiding curve 18 provided in the lateral walls of the casing 19 of the beverage production module 2.

As can be seen from the figures, also the second guiding curve 18 is composed of at least two different segments, such as for example an essentially horizontal linear segment 21 and an inclined linear segment 20 being raised to the rear end of the module.

Due to the cooperation of the guiding pin 16 with this particular design of the second guiding curve 18, the first engagement member 3 carries out an essentially linear relative movement vis-à-vis the second engagement member 4 when the first and the second engagement member are close together, while the upwards inclined second linear segment 20 of the control curve 18 results in the swivelling movement of the first engagement member 3 such that the half dome defined by the bell member 13 is rotated slightly downwards, as it is illustrated in FIG. 3e.

As shown in FIGS. 7a to 7c, the actuator mechanism 7 of the second embodiment comprises a drawer 34 acting on a coupling element 39 which in turn is coupled to the guiding pin 16 of the first engagement member 3.

The drawer 34 is adapted to be manually operated by a user. When moving the drawer 34, the movement via the coupling element 39 will be transferred to the pin 16 of the first engagement member so that by operating the drawer 34 the capsule is transferred from the capsule insertion state to the engagement state. With a reverse movement of the drawer 34 the capsule 1 is liberated from the engagement state and can be discharged.

The drawer 34 is attached to one side of the casing 19. As shown in FIGS. 7a to 7c the drawer is attached to the top of the casing 19. The drawer 34 hereby is attached moveably to the casing 19, so that the drawer 34 can be moved in a direction parallel to the side of the casing 19 to which it is attached.

The drawer 34 cooperates with one end of the coupling element 39 so that the movement of the drawer 34 is transferred to the coupling element 39. The other end of the coupling element 39 cooperates with the pin 16 of the first engagement member 3 so that in turn the movement of the coupling element 39 is transferred to the guiding pin 16 and thereby to the first engagement member 3.

The drawer 34 is a substantially flat element covering at least partially the side of the casing 19 to which it is moveably attached. The casing 19 hereby provides a guiding bar 35 for enabling the movement of the drawer 34 and at the same time limiting the movement of the drawer 34 in a direction parallel to the side of the casing 19 to which the drawer 34 is attached.

On each side of the drawer 34 a drawer pin 37 is provided. This drawer pin 37 slides within a bar opening 36 provided on both sides of the drawer 34 within the guiding bar 35. Alternatively, the guiding bar 35 and the bar opening 36 can be separated so that the guiding bar 35 extends along the whole side of the casing 19 and the bar opening is provided beyond or above the guiding bar 35.

When moving the drawer 34 the drawer pin 37 slides along the bar opening 36 and the drawer pin 37 is further provided to operate with a hole 52 at one end of the coupling element.

Thereby, when moving the drawer 34 one end of the coupling element 39 executes a movement parallel to the movement of the drawer 34 and along the side of the casing 19.

FIG. 11 shows a detailed view of the coupling element 39 according to the second embodiment of the present invention. The coupling element 39 has a substantially longitudinal shape and substantially comprises tow sections, namely a first coupling element section 50 and a second coupling element section 51. The second section 51 is shorter in length than the first section 50 and forms an obtuse angle with the first section 50.

At the end of the first section 50 a hole 52 is provided for cooperating with the drawer pin 37. Two further longitudinal openings are provided in the coupling element 39 which form a first guiding curve 41 and a second guiding curve 44.

The second guiding curve 44 extends over the whole second section 51 and over a part of the first section 50. Thereby the second guiding curve 44 comprises a first linear section 42 along the second section 51 of the coupling element 39 and a second linear section 43 along a part of the first section 50 of the coupling element, said first and second linear section 42, 43 forming an obtuse angle.

Along the first section 50 between the hole 52 and the second guiding curve 44 the first guiding curve 41 is provided which extends partially over the first section 50.

Figure 7:
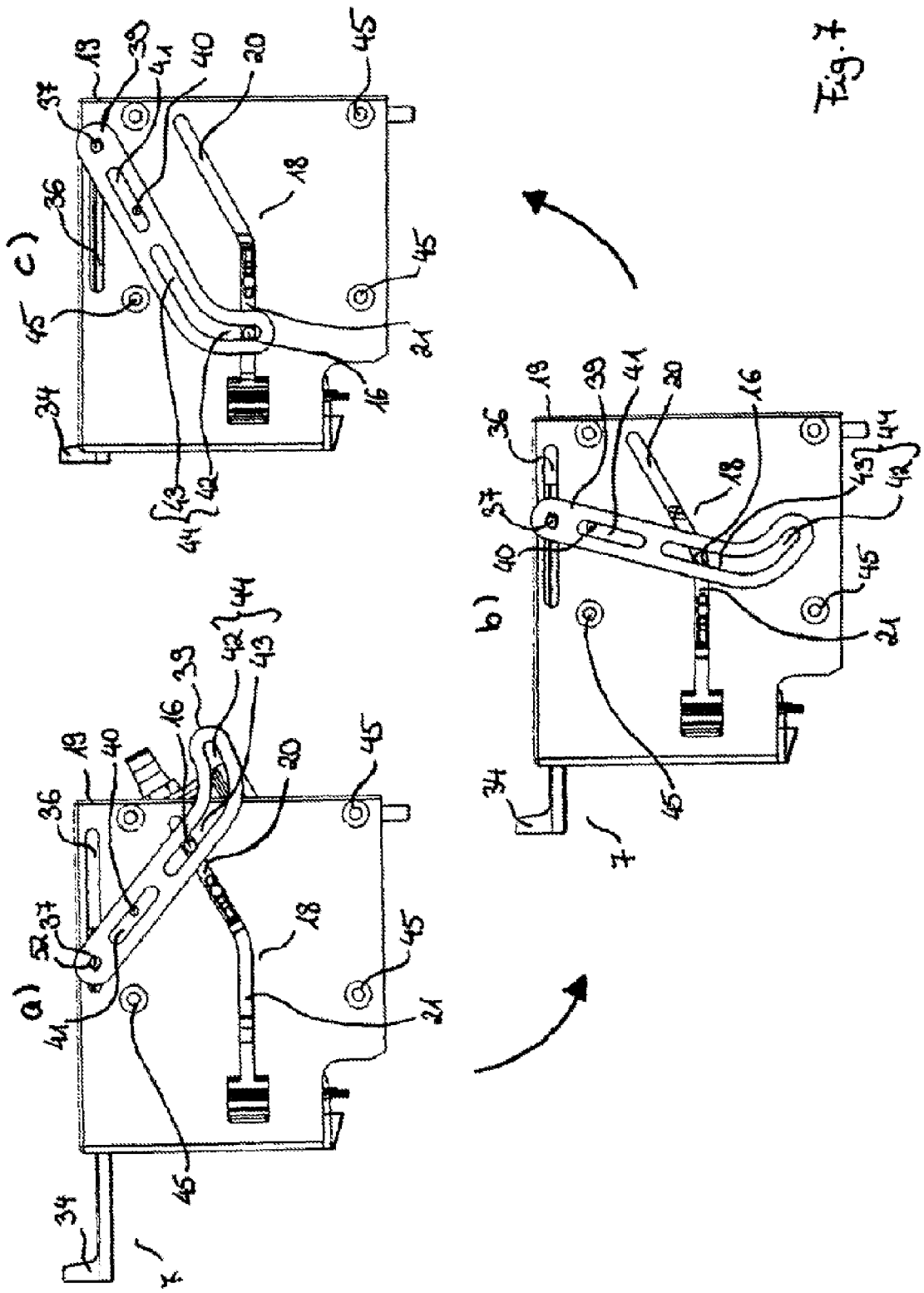
FIGS. 7a to 7c show a sequence illustrating the control and guiding means for the relative movements of the first and second engagement member and the perforation means, respectively, according to a second embodiment of the present invention.

With reference to FIGS. 7 and 8 the detailed functionality of the actuator mechanism according to the second embodiment will now further be explained.

A fixed pin 40 is provided on the casing 19 and fixedly attached to the casing 19. The fixed pin 40 operates with the first guiding curve 41 of the coupling element 39.

The first guiding curve 41 cooperating with the fixed pin 40 has an elongated shape. The fixed pin serves substantially as a centre of rotation of the coupling element 39. Due to the elongated shape of the first guiding curve 41 in addition to the rotational movement of the coupling element 39 around the fixed pin 40 a slight lateral movement is possible. The lateral movement and the rotational movement thereby superimpose.

Thereby, when moving the drawer 34 the coupling element 39 executes a substantially rotating movement around the fixed pin 40.

The second guiding curve 44 is made to cooperate with the guiding pin 16 of the first engagement member 3. Thereby, when moving the drawer 34 in a first direction caused by the substantially rotational movement of the coupling element 39 around the fixed pin 40, the guiding pin 16, is moved in a second direction due to the cooperation with the second guiding curve 44. This second direction is substantially an opposite direction to the first movement direction of the drawer 34.

As can be seen in FIGS. 7 and 8 the second guiding curve 44 is essentially composed of a first linear section 42 and a second linear section 43, being shorter than the first linear section 42 and forming an obtuse angle vis-à-vis the first linear section 42.

When starting from the capsule insertion position FIGS. 7a and 8a, the guiding pin 16 is made to cooperate with the first linear section 42 which is designed to linearly and integrally displace the first engagement member 3.

On the other hand, in the final phase, i.e. when the first engagement member 3 approaches the beverage production state (transition from FIGS. 7b to 7c and 8b to 8c), the guiding pin 16 is made to cooperate with the second linear section 43 of the second guiding curve 44. The second linear section 43 is designed to essentially control a relative displacement of the U-shaped support member 25 and the fixedly attached perforation member 6 vis-à-vis the dome shaped member 13.

In addition to the cooperation with the second guiding curve 44 in accordance with the first embodiment, the guiding pin 16 is also designed to cooperate with the second control curve 18 provided in the lateral walls of the casing of the beverage production module 2.

With reference to FIGS. 8a to 8c further details of the second embodiment will now be explained. The drawer 34 comprises a holding element 48 adapted to be gripped by a user who wants to manually operate the drawer 34. The holding element 48 further serves for stopping the movement of the drawer 34 when the drawer is moved from the capsule insertion state to the capsule engagement state. The holding element 48 is herefor formed as a plate attached to the drawer 34 forming a substantially rectangular angle with the sliding part of the drawer 34.

The drawer 34 in addition comprises a capsule insertion slot 38 which enables the insertion of a capsule. FIG. 8a shows the beverage production module 2 in the capsule insertion state. In this state the drawer 34 has been moved into a direction away from the beverage production module so that a significant part of the drawer 34 protrudes the casing 19. The movement in a direction away from the casing 19 is stopped by the drawer pin 37 when reaching the end of the bar opening 36. In this capsule insertion state the capsule insertion slot 38 of the drawer 34 is placed above and in alignment with the capsule insertion slot 8 of the beverage production module 2 so that a capsule 1 can be inserted.

For moving the first engagement member 3 towards the second engagement member 4 the drawer 34 has to be pushed in a direction towards the beverage production module 2. The drawer pin 37 thereby cooperates with the coupling element 39 which in turn executes a substantially rotational movement around the fixed pin 40 and thereby cooperates with the guiding pin 16 so that the first engagement member 3 is moved towards the second engagement member 4.

In the capsule engagement state as shown in FIG. 8c the drawer 34 is substantially in alignment with the casing 19 and only the holding element 48 of the drawer 34 protrudes the casing 19.

As can be seen from FIGS. 8a to 8c the drawer 34 is guided along a guiding bar 35 provided on both sides of the drawer 34. As the holding element 48 has a shape that is greater than the guiding bar 35 the movement of the drawer 34 is stopped by the holding element 48. Further, a recess 49 in the guiding bar 35 may be provided to house the holding element 48 or parts of the holding element 48 when the drawer 34 is pushed in direction of the casing 19.

Alternatively, instead of stopping the movement of the drawer 34 by the holding element 48, the movement of the drawer 34 in both directions may be stopped by the drawer pin 37 when reaching the ends of the bar opening 36, respectively.

As shown in FIG. 9 the interior functions of the beverage production module 2 according to the second embodiment correspond to the interior functions and movements of the beverage production module according to the first embodiment. With movement of the drawer 34 the coupling element 39 operates with the guiding pin 16 in a way, that the first engagement member 3 is moved towards the second engagement member 4 in order to clamp the capsule 1 and in the capsule engagement step then the perforation member 6 will perforate the capsule.

As shown in FIGS. 7a to 7c and 8a to 8c, knobs 45 are attached to the casing 19. The knobs 45 hereby serve for attaching a cover 46 to the casing 19. As shown in FIG. 10 a cover 46 is attached to the knobs 45. The cover 46 hereby extends over those parts of the casing where moving elements are provided. Specifically, the cover 46 extends over the part of the casing 19 where the coupling element 39 is provided and in addition extends over a part of the top of the casing 19 where the drawer 34 is moving. The cover 46 hereby in any case is not extending over the capsule insertion slot 8 of the casing in order to allow the insertion of a capsule. The cover 46 in addition may comprise a cover extension 47 which extends along the lateral side of the casing 19 and covers the linear part 21 of the second control curve 18.

Other mechanical or electric implementations can be thought of for guaranteeing a composite trajectory of the first engagement member such that in and close to the beverage production state the two engagement members 3, 4 are moved in a linear relative trajectory, while they are moved relative to each other in a different trajectory (different angle an/or curvature) when distanced from each other.

With reference to FIGS. 6a to 6c now a further aspect of the present invention will be explained.

According to this aspect the capsule 1 is pre-positioned by pre-fixation means, such as for example flexible capsule pre-fixation arms 12. When seen from above (FIG. 6) the arms 12 are provided at the lateral sides of the capsule.

The flexible arms 12 respectively present a vertical groove 31 made to engage with the rim of the capsule 1.

Therefore, when the capsule 1 is inserted manually by a user from the top of the beverage production module, it will be initially pre-positioned and held in place by the flexible arms 12. Note that this pre-fixation position as shown in FIG. 6 is not the same position as the final beverage production position (FIG. 6c).

Actually, when the first engagement member 3 is made to approach the second engagement member 4, the front side of the bell-shaped member 13 of the first engagement member 3 will push against the rim of the capsule I, will make the capsule leave the pre-fixation position in the vertical grooves 31 and will displace (push) the capsule 1 to the final beverage production position as shown in FIG. 6c.

To this regard means can be provided to actively disengage the rim of the capsule 1 with the pre-fixation means (flexible arms) 12. As shown particularly in FIG. 6b, the first engagement member 3 can be operatively connected to disengagement means 32 which cooperate with a slanted surface 33 of the flexible arms 12 in order to push the flexible arms 12 to the outside and thus to disengage the vertical grooves 31 of the flexible arms 12 from the rim of the capsule 1.

Thus, when the front surface of the bell-shaped member 13 of the first engagement member 3 is taking over the positioning of the capsule 1, the capsule 1 is made to be disengaged from the flexible arms 12 serving as prefixation means.

In the beverage production position as shown in FIG. 6c, the rim of the capsule 1 is pushed behind the grooves 31 of the flexible arms 12.

Now, when after completion of the beverage production the first engagement member 3 is moved rearwards (to the top in FIG. 6) and the capsule 1 is only held by a frictional engagement of the perforation member 6, the disengagement member 32 of the first engagement member 3 will again cooperate with specifically designed surfaces of flexible arms 12 in order to spread these arms 12 and thus have the capsule 1 pass these arms 12 without being engaged by the arms 12.

Figure 6:
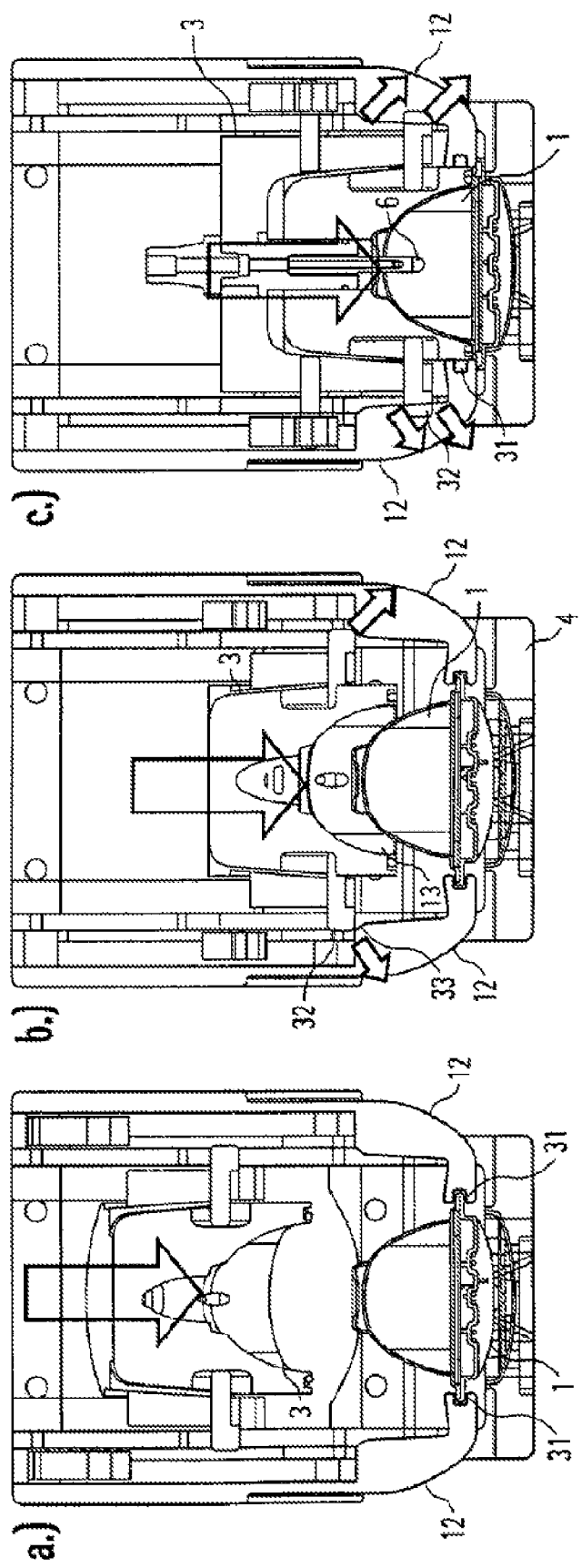
FIG. 6 shows in a sequence of steps from a capsule insertion state (FIG. 6a) to a figure enclosure state (FIG. 6c) illustrating the pre-fixation of the capsule before being engaged between the first and second engagement member.

To summarize, where the design as shown in FIG. 6 the capsule 1 can be pre-positioned in a position which is horizontally offset from the beverage production position. The capsule 1 is pre-positioned in this position until the front surfaces of the bell-shaped member 13 engages the rim of the capsule 1.

LIST OF REFERENCE SIGNS

1 Capsule
2 Beverage production module
3 1st engagement member
4 2nd engagement member
5 ingredients
6 perforation member
7 actuator mechanism
8 capsule insertion slot of (2)
9 lever handle
10 axis
11 knee joint mechanism
12 capsule pre-fixation arms
13 bell-shaped dome of (3)
14 fluid supply for (6)
15 Coupling of (3) and (6)
16 Guiding pin
17 1st Control curve
18 2nd Control curve, arranged in (19)
19 Casing of (2)
20 Rotation part of (18)
21 Linear part of (18)
22 Flange-like rim of (1)
23 Holding flange of (4)
24 Discharge opening of (19)
25 U-shaped support member
26 Legs of (25)
27 Guiding pin
28 Axial slots in (13)
29 1st linear section of (17)
30 2nd linear section of (17)
31 groove of (12)
32 disengagement member
33 slanted surface of (12)
34 drawer
35 guiding bar
36 bar opening
37 drawer pin
38 capsule insertion slot in (34)
39 coupling element
40 fixed pin
41 first guiding curve
42 first linear section of (44)
43 second linear section of (44)
44 second guiding curve
45 knob
46 cover
47 cover extension
48 holding element
49 recess
50 first coupling element section
51 second coupling element section
52 hole 52

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for operating a beverage production system comprising a module and a capsule containing ingredients, wherein the module injects a liquid into the capsule to produce a beverage, and wherein the module comprises at least a first capsule engagement member and a co-operating second capsule engagement member, the method comprising the steps:
   a.) inserting the capsule in the beverage production module;
   b.) engaging the capsule with an at least partially conformal part of the first capsule engagement member to hold the capsule in a fixed position, and the capsule is engaged by the at least partially conformal part by moving the first capsule engagement member relative to the second capsule engagement member into a closing position;
   c.) using a perforation member provided by the first capsule engagement member to open the capsule after the capsule is held in the fixed position by the at least partially conformal part in step b.); and
   d.) displacing the first capsule engagement member relative to the second capsule engagement member.

2. The method according to claim 1, wherein the perforation member is placed in a position selected from the group consisting of inside and outside the capsule.

3. The method according to claim 1, wherein the beverage production is performed while the capsule is still held in the fixed position by the conformal part in step c.).

4. The method according to claim 1, wherein the capsule is pre-positioned in a defined manner before it is engaged by the first and second engagement members, and the pre-position is different than the defined opening position in step c.).

5. The method according to claim 1, comprising displacing the perforation member using a mechanical coupling between the first engagement member and the perforation member, to open the capsule after the capsule is retained in the fixed position.

6. The method according to claim 1, wherein the first engagement member and the perforation member are controlled by a common actuator.

7. A method for operating a system for producing a beverage comprising a module and a capsule containing ingredients wherein the module injects a liquid into the capsule in order to produce a beverage, and wherein the module comprises at least a first capsule engagement member and a co-operating second capsule engagement member, the method comprising the following steps:
   inserting a capsule containing beverage ingredients into a beverage product module;
   engaging the capsule with an at least partially conformal part of the first capsule engagement member to hold the capsule in a fixed position, and the capsule is engaged by the at least partially conformal part by moving the first capsule engagement member relative to the second capsule engagement member;

using a perforation member provided by the first capsule engagement member to open the capsule after the capsule is held in position by the at least partially conformal part; and displacing the first capsule engagement member relative to the second capsule engagement member with a combined displacement comprising a linear displacement when the first and second capsule engagement members are close together and a swiveling movement when distanced from each other.

8. The method according to claim 7 further comprising moving the perforation member from a protruding position to a retracted position within the first capsule engagement member during the swiveling movement to drop the capsule from the first capsule engagement member by gravity.

9. The method according to claim 1, wherein the perforation member is a hollow needle.

10. The method according to claim 1, further comprising injecting the liquid into the capsule through the perforation member.

11. The method according to claim 6, comprising displacing the first capsule engagement member with a knee-joint mechanism that connects the first capsule engagement member to a manually operable lever handle provided by the actuator.

12. The method according to claim 6, comprising displacing the first capsule engagement member with a coupling element that connects the first capsule engagement member to a manually operable drawer provided by the actuator.

13. The method according to claim 6, wherein the actuator moves the perforation member between a retracted position and a protruding position within the first capsule engagement member.

14. The method according to claim 13, wherein the perforation member remains in the protruded position during an initial portion of the displacement of the first capsule engagement member to hold the capsule within the at least partially conformal part of the first capsule engagement member.

* * * * *